United States Patent Office 3,047,615
Patented July 31, 1962

3,047,615
NOVEL CYCLOPENTANO-NAPHTHALENE
COMPOUNDS
Gérard Nominé, Noisy-le-Sec, France, assignor, by mesne assignments, to Roussel-UCLAF, S.A., Paris, France, a corporation of France
No Drawing. Filed Feb. 2, 1960, Ser. No. 6,111
Claims priority, application France Feb. 12, 1959
3 Claims. (Cl. 260—476)

The present invention has as its object a process for the preparation of novel cyclopentano-naphthalene compounds and, more particularly, the preparation of $\Delta^{9(10)}$-3-methyl-7-oxo-3,4-[3'-acyloxy-cyclopentano-(2',1')]-octahydronaphthalene compounds of the formula

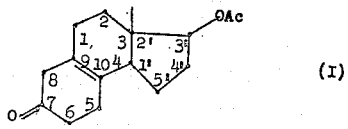

(I)

wherein Ac represents the acyl radical of an organic carboxylic acid having 1 to 12 carbon atoms. These novel tricyclic ketones of the Formula I are of considerable importance as intermediate products in the synthesis of steroids and analogous compounds. They can be condensed with methyl acrylate to give esters which upon further synthesis steps result in esters of 19-nor-testosterone according to the method of Chinn et al. (Résumé of the 134th Meeting, American Chemical Society, September 1958, page 14–0) as shown in the following reaction scheme.

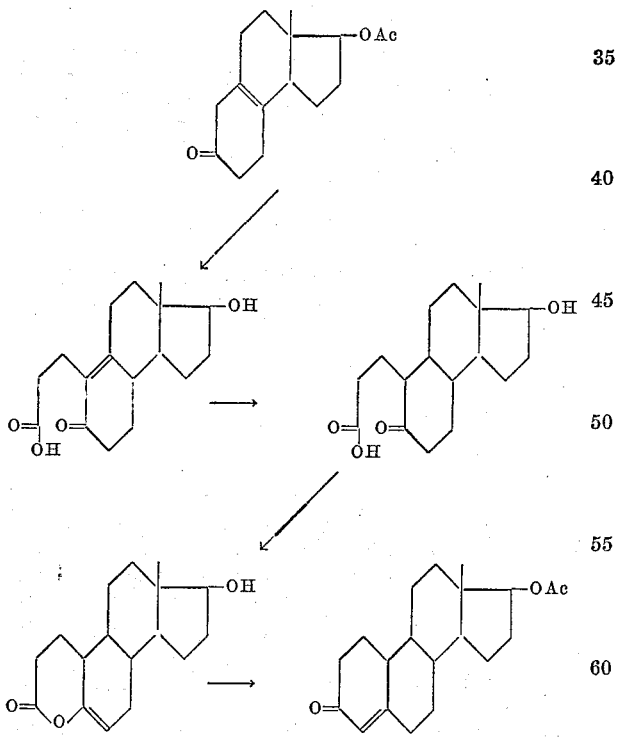

The role played by cyclopentano-naphthalene compounds comprising a ketone function in the 7-position in the synthesis of steroids is well known. Usually, these compounds are obtained by starting with a benzo-hydrindane which is reduced into the diene-enol. This diene-enol is hydrolysed by means of a mineral acid to yield a conjugated ketone with one double bond (see Chinn et al., Résumé of the 134th meeting of the American Chemical Society, September 1958, page 14–0), in accordance with the following simplified reaction equation

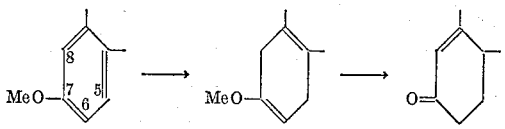

However, these conjugated ketones which have an activated methylene group in the 1-position due to the vinyl grouping are easily subjected to secondary condensations at this methylene group in the 1-position, whereby the yield of the desired product (a condensation at the 8-position) is diminished.

An object of the present invention is the production of novel cyclopentano-naphthalene compounds having a doubly activated methylene group in the 8-position.

A further object of the present invention is the production of $\Delta^{9(10)}$-3-methyl-7-oxo-3,4-[3'-acyloxy-cyclopentano-(2',1')]-octahydronaphthalene compounds having the structural formula

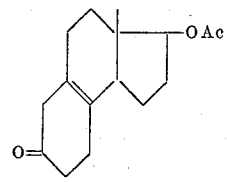

wherein Ac represents the acyl radical of an organic carboxylic acid having 1 to 12 carbon atoms.

Another object of the invention is a process for the production of $\Delta^{9(10)}$-3-methyl-7-oxo-3,4-[3'-acyloxy-cyclopentano-(2',1')]-octahydronaphthalene.

These and other objects of the invention will become more apparent as the description proceeds.

I have discovered that the novel $\Delta^{9(10)}$-3-methyl-7-oxo-3,4-[3'-acyloxy-cyclopentano-(2',1')]-octahydronaphthalene compounds of our invention have the advantage that they contain a doubly activated methylene group in the 8 position, that is the position on which the future A-ring will be built up, due to the neighboring presence of a ketone function as well as a double bond.

The process for their preparation consists essentially of subjecting $\Delta^{6(7),9(10)}$-3-methyl-7-alkoxy-3,4-[3'-acyloxy-cyclopentano-(2',1')]-hexahydro-naphthalene compounds of the formula

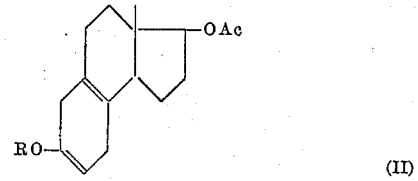

(II)

wherein R is a lower alkyl radical and Ac has the meaning defined above, to hydrolysis with the aid of organic carboxylic acids, in solution in an inert solvent at elevated temperatures. Preferably oxalic acid or acetic acid are used as hydrolysing agents in the presence of ethanol at temperatures from about 40° C. to 80° C. and thereafter the desired ketone I is isolated by means of customary procedures.

The diene compounds II used as starting materials are obtained by classic esterification of the corresponding alcohols.

A preferred mode of execution is to employ the benzoate as the ester of diene compound II, but other esters of organic carboxylic acids having 1 to 12 carbon atoms such as the alkanoates, the acetate, the trimethyl acetate, the propionate, the 4,4-dimethyl-pentanoate, the 10-undecanoate; the cycloalkyl alkanoates, the β-cyclopentyl-propionate; the arylalkanoates, the phenyl-propionate; the cycloalkanoates, the hexahydrobenzoate, the hexahydroterephthalate; and other phenyl-carboxylic acids may also be used without departing from the scope of the invention.

The following examples illustrate the invention, they are, however, not to be construed as providing any limiting characteristics. The temperatures are given in degrees centigrade.

EXAMPLE I

*Preparation of $\Delta^{9(10)}$-3-Methyl-7-Oxo-3,4-[3'-Benzoxy-Cyclopentano - (2',1')] - Octahydronaphthalene (I, Ac=$C_6H_5CO$)*

(a) PREPARATION of $\Delta^{6(7),9(10)}$-3-METHYL-7-METHOXY-3,4-[3'-BENZOXY-CYCLOPENTANO-(2',1')]-HEXAHYDRONAPHTHALENE (II, Ac=$C_6H_5CO$)

4 gm. of raw $\Delta^{6(7),9(10)}$-3-methyl-7-methoxy-3,4-[3'-hydroxy-cyclopentano - (2',1')] - hexahydronaphthalene, having a melting point of 92° C., prepared according to Chinn et al., Résumé of the 134th meeting of the American Chemical Society, September 1958, page 14–0, are dissolved in 16 cc. of pyridine and then, while stirring, 6 cc. of benzoyl chloride are added slowly in an atmosphere of nitrogen. The agitation is maintained for 6 hours at 15 to 20° C.; the reaction mixture turns orange pink. The mixture is iced and a solution of 21.5 gm. of bicarbonate of sodium in 260 cc. of water is added. Carbon dioxide is evolved and a pinkish white precipitate appears. After vacuum filtration, washing three times with 50 cc. aliquots of water and drying in vacuo, the raw benzoate (II) having a melting point of 110 to 120° C. is obtained. The product is taken up in 100 volumes of methanol, the solution is refluxed, filtered while hot, iced, vacuum filtered and the filter cake is dried, yielding 4.18 gm. of crystalline $\Delta^{6(7),9(10)}$-3-methyl-7 - methoxy - 3,4 - [3' - benzoxy-cyclopentano - (2',1')]-hexahydronaphthalene having a melting point of 150 to 151° C. (yield: 74%). For analysis, the product is recrystallized a second time for methanol, then from isopropyl ether and finally from cyclohexane. The product thus obtained, having a melting point of 151° C., is in the form of white needles which are very soluble in the cold in acetone, benzene and chloroform, soluble in the hot in methyl alcohol, cyclohexane and ethyl acetate, insoluble in water and unstable in dilute aqueous acids or alkalies.

Analysis: $C_{22}H_{26}O_3$; molecular weight—338.43.
 Calculated—C, 78.07%; H, 7.74%.
 Found—C, 78.2%; H, 7.7%.
Ultraviolet spectrum in ethanol:
 $\lambda_{max.}$—229 m$\mu$, 280 m$\mu$, 273 m$\mu$.
 $\epsilon$ 16,200—1083, 1192.
Infrared spectrum in carbon disulfide:
 Bands at 1720 cm.$^{-1}$.
 Bands at 1664 cm.$^{-1}$.

The reaction to m-dinitrobenzene is negative.

Saponification No.: 172–174, theory being 165.5.

This compound is not described in the literature.

(b) $\Delta^{9(10)}$-3-METHYL-7-OXO - 3,4-[3'-BENZOXY-CYCLOPENTANO - (2',1')] - OCTAHYDRONAPHTHALENE (I, Ac=$C_6H_5CO$)

A suspension of 7.70 gm. of compound II, (Ac=$C_6H_5CO$)

obtained according to (a) above, in 155 cc. of 90% ethanol, is heated to 55° C. while agitating and in an atmosphere of nitrogen and then a hot solution of 6.16 gm. of oxalic acid in 30 cc. of 90% ethanol is added thereto. The crystals of benzoate II dissolve in about 15 minutes and heating is maintained for several minutes more. After rapidly cooling, an iced solution of sodium bicarbonate is added to the suspension and the mixture is agitated for several minutes until the evolution of gas, caused by the bicarbonate, ceases. The product in suspension is filtered, washed with water and dried in vacuo, yielding 7.418 gm. of raw compound I (Ac=$C_6H_5CO$) having a melting point of 120° C. The compound is first recrystallized from 10 volumes of cyclohexane, then from 8 volumes of methanol. There is obtained a yield of 5.70 gm. (which is 77% of theory) of crystalline $\Delta^{9(10)}$-3-methyl-7-oxo - 3,4 - [3' - benzoxy-cyclopentano-(2',1')]-octahydronaphthalene (I) in the form of white needles having a melting point of 127° C. This novel product is very soluble in the cold in acetone, benzene and chloroform; soluble in the hot in methyl alcohol, isopropyl ether and cyclohexane and insoluble in water.

Analysis: $C_{21}H_{24}O_3$; molecular weight—324.40.
 Calculated—C, 77.75%; H, 7.46%.
 Found—C, 77.9%; H, 7.4%.
Ultraviolet spectrum:
 $\lambda_{max.}$—230 m$\mu$, 273 m$\mu$, 280 m$\mu$.
 $\epsilon$ 14,500—963, 800.

EXAMPLE II

*Isomerization of $\Delta^{9(10)}$ Compound to Give the $\Delta^{8(9)}$-3-Methyl-7-Oxo-3,4-[3'-Benzoxy-Cyclopentano - (2',1')]-Octahydronaphthalene*

200 mg. of the benzoate I, obtained according to the preceding example, are introduced into a solution of 4 cc. of methanol containing 0.5 cc. of 22° Bé. hydrochloric acid, and refluxed for 2 minutes. Upon cooling, white crystals having a melting point of 151° C. appear. On mixing these crystals with crystals of $\Delta^{8(9)}$-3-methyl-7-oxo-3,4-[3'-benzoxy-cyclopentano - (2',1')] - octahydronaphthalene, obtained by the benzolation of the corresponding alcohol, there is no decrease in the melting point.

Ultraviolet spectrum:
 $\lambda_{max.}$—240 m$\mu$.
 $\epsilon$=773.

This compound is not described in the literature.

The preceding examples are not to be construed as limiting the invention. It is evident to one skilled in the art that temperatures, the nature of the solvents or the organic carboxylic acid ester may be varied or that equivalent techniques may be used without departing from the spirit of the invention or the scope of the appended claims.

I claim:
1. The $\Delta^{9(10)}$-3-methyl - 7 - oxo-3,4-[3'-acyloxy-cyclopentano - (2',1')] - octahydronaphthalene compounds of the formula

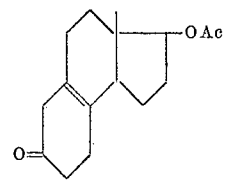

wherein Ac and acyl represent the acyl radical of an organic carboxylic acid having 1 to 12 carbon atoms selected from the group consisting of alkanoic acids, cycloalkyl alkanoic acids, phenyl alkanoic acids, cycloalkanoic acids, cycloalkanedioic acids and benzene carboxylic acids.

2. $\Delta^{9(10)}$-3-methyl - 7 - oxo-3,4-[3'-benzoxy-cyclopentano-(2',1')]-octahydronaphthalene.

3. $\Delta^{6(7),9(10)}$-3-methyl - 7 - methoxy-3,4-[3'-benzoxy-cyclopentano-(2',1')]-hexahydronaphthalene.

References Cited in the file of this patent

Noller: Chemistry of Organic Compounds, page 161 (1957) (Saunders).

Chinn et al.: Abstracts of Papers, presented at 134th Meeting of the American Chemical Society at Chicago, Illinois, September 7 to 12, 1958, pages 14–15.

Fieser and Fieser: Steroids, pp. 588 and 589 (1959) (Reinhold).